(12) United States Patent
Liu

(10) Patent No.: US 10,030,690 B2
(45) Date of Patent: Jul. 24, 2018

(54) HIGH-NEGATIVE-PRESSURE COMPOSITE HARD SUCTION CUP

(71) Applicant: XIAMEN NAILLESS TECHNOLOGY CO., LTD., Xiamen (CN)

(72) Inventor: Jianping Liu, Xiamen (CN)

(73) Assignee: XIAMEN NAILLESS TECHNOLOGY CO., LTD., Xiamen, Fujian (CN)

( * ) Notice: Subject to any disclaimer, the term of this patent is extended or adjusted under 35 U.S.C. 154(b) by 156 days.

(21) Appl. No.: 15/107,103

(22) PCT Filed: Aug. 10, 2015

(86) PCT No.: PCT/CN2015/086465
§ 371 (c)(1),
(2) Date: Jun. 22, 2016

(87) PCT Pub. No.: WO2016/029789
PCT Pub. Date: Mar. 3, 2016

(65) Prior Publication Data
US 2017/0292559 A1 Oct. 12, 2017

(30) Foreign Application Priority Data

Aug. 28, 2014 (CN) .................... 2014 2 0507376 U

(51) Int. Cl.
*F16B 47/00* (2006.01)
*A47G 29/087* (2006.01)
*G01M 3/26* (2006.01)
*G08B 5/22* (2006.01)

(52) U.S. Cl.
CPC ............ *F16B 47/00* (2013.01); *A47G 29/087* (2013.01); *G01M 3/26* (2013.01); *G08B 5/22* (2013.01)

(58) Field of Classification Search
CPC .. B65G 2249/045; B66C 1/0218; F16B 47/00
See application file for complete search history.

(56) References Cited

U.S. PATENT DOCUMENTS

| | | | |
|---|---|---|---|
| 3,759,560 A * | 9/1973 | Yoda | B66C 1/0212 294/186 |
| 3,970,341 A * | 7/1976 | Glanemann | B66C 1/0212 294/186 |
| 5,184,858 A * | 2/1993 | Arai | B65G 49/061 116/70 |

(Continued)

*Primary Examiner* — Bradley Duckworth
(74) *Attorney, Agent, or Firm* — Leong C. Lei

(57) ABSTRACT

The high-negative-pressure composite hard suction cup has a main member made of a hard, composite material tightly joined to a highly flexible washer made of soft plastic along a bottom side. The main member is configured with a vacuuming mechanism to another side. The vacuuming mechanism includes a piston chamber, one-way valve, piston assembly, and spring. A vacuum alarming assembly is configured on the piston assembly. When a degree of vacuum between the hard suction cup and an object attached is less than satisfactory, an audio or visual alarm is issued and an alert marking is revealed to notify a user to take appropriate action so that the hard suction cup remains reliably attached to the object.

3 Claims, 2 Drawing Sheets

(56) References Cited

U.S. PATENT DOCUMENTS

| | | | | |
|---|---|---|---|---|
| 5,795,001 A * | 8/1998 | Burke | ............... | B65G 49/061 |
| | | | | 294/185 |
| 7,475,860 B2 * | 1/2009 | Chien | ............... | F16B 47/00 |
| | | | | 248/363 |
| 7,665,706 B2 * | 2/2010 | Chien | ............... | A47K 3/003 |
| | | | | 248/206.3 |
| 7,673,914 B2 * | 3/2010 | Liao | ............... | F16B 47/00 |
| | | | | 116/70 |
| 8,104,809 B1 * | 1/2012 | Mayhugh | ............... | B25B 11/007 |
| | | | | 248/205.8 |
| 9,057,398 B2 * | 6/2015 | Yang | ............... | F16B 47/006 |
| 9,581,291 B2 * | 2/2017 | Trotsky | ............... | F16M 11/041 |
| 2006/0231705 A1 * | 10/2006 | Liu | ............... | F16B 47/00 |
| | | | | 248/205.5 |
| 2012/0112023 A1 * | 5/2012 | Tollman | ............... | F16B 47/00 |
| | | | | 248/205.7 |
| 2014/0027588 A1 * | 1/2014 | Chen | ............... | F16B 47/00 |
| | | | | 248/205.3 |

\* cited by examiner

HIGH-NEGATIVE-PRESSURE COMPOSITE HARD SUCTION CUP

BACKGROUND OF THE INVENTION

(a) Technical Field of the Invention

The present invention is generally related to parts for daily products and specialized tools, and more particular to negative-pressure suction cups.

(b) Description of the Prior Art

The present applicant filed a China patent application in 2010 whose patent no. is ZL201010003309.8, and the China patent disclosed a suction cup attachable to an airtight surface regardless of its flatness or smoothness. After production and practical application for four years, the present applicant noticed that there is still room for improvement for the suction cup with respect to its structure and material so as to enhance its production efficiency and yield. Through the employment of new technical structure and material art, the suction cup can be more reliable and safe during usage, in addition to its superior suction performance. A new patent application is therefore filed.

SUMMARY OF THE INVENTION

The present invention discloses a hard suction cup made of a composite material and capable of being formed into various shapes. In contrast to the conventional disc-shaped soft suction cup, the hard suction cup employs high negative pressure to improve the reliability of the attachment of the hard suction cup to an object. A highly flexible washer of the hard suction cup is significantly deformed under the high pressure, effectively enhancing the airtightness and friction between the hard suction cup and the object. The hard suction cup is therefore attachable to an airtight object surface regardless of its flatness and smoothness with enhanced weight bearing capability. When a degree of vacuum of the hard suction cup drops to a certain level, an alarm is issued to alert a user to take responsive action in restoring the required degree of vacuum so that the hard suction cup does not fall of from the object.

The present invention involves the following technical means.

The high-negative-pressure composite hard suction cup includes a main member, a highly flexible washer, protruding ribs, a piston chamber, a one-way valve, a spring, a piston assembly, a chamber cap, first and second conductive columns, insulating bodies, wires, a battery, an audio/visual indicator. The piston chamber, one-way valve, spring, and piston assembly jointly form a vacuuming mechanism. The piston assembly includes a piston body, a sealing ring, a button, a conductive ring, and an alert marking. The first and second conductive columns, insulating bodies, wires, a battery, and an audio/visual indicator jointly form a vacuum alarming assembly.

The high-negative-pressure composite hard suction cup has a main member tightly joined to a highly flexible washer of soft plastic along a bottom side of the main member. The main member is made of a hard, composite material and can be formed into various shapes. The washer is formed into a compatible shape. A number of protruding ribs are configured at an interface of the main member with the washer. A vacuuming mechanism is configured to another side of the main member and includes a piston chamber, and a one-way valve, a piston assembly, and a spring, all inside the piston chamber. The piston chamber surrounds a channel running vertically through the main member and connecting the inside of the piston chamber to outside of the main member; and the one-way valve is disposed above the channel. The piston assembly is supported by the spring and the piston assembly therefore is vertically moveable within the piston chamber. A vacuum alarming assembly is configured on the piston assembly. By using springs of different elasticity, various degrees of vacuum can be indicated and alarmed. The piston assembly includes a piston body, a sealing ring on a bottom flange of the piston body, a button mounted on the piston body, a conductive ring configured on a bottom flange of the button, and an alert marking configured on a circumference of the button. The conductive ring and the alert marking therefore move along the piston assembly. The vacuum alarming assembly includes a first conductive column, a second conductive column, two insulating elastic bodies, conductive wires, a battery, and an audio/visual indicator. The insulating elastic bodies are disposed oppositely in a chamber cap mounted on a top end of the piston chamber. The first and second conductive columns are embedded in the insulating elastic bodies, respectively, and are series-connected to the audio/visual indicator and the battery through the wires. The contact or separation of the first and second conductive columns with or from the conductive ring closes or breaks a circuit involving the audio/visual indicator and the battery, therefore turning on or off the audio/visual indicator.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
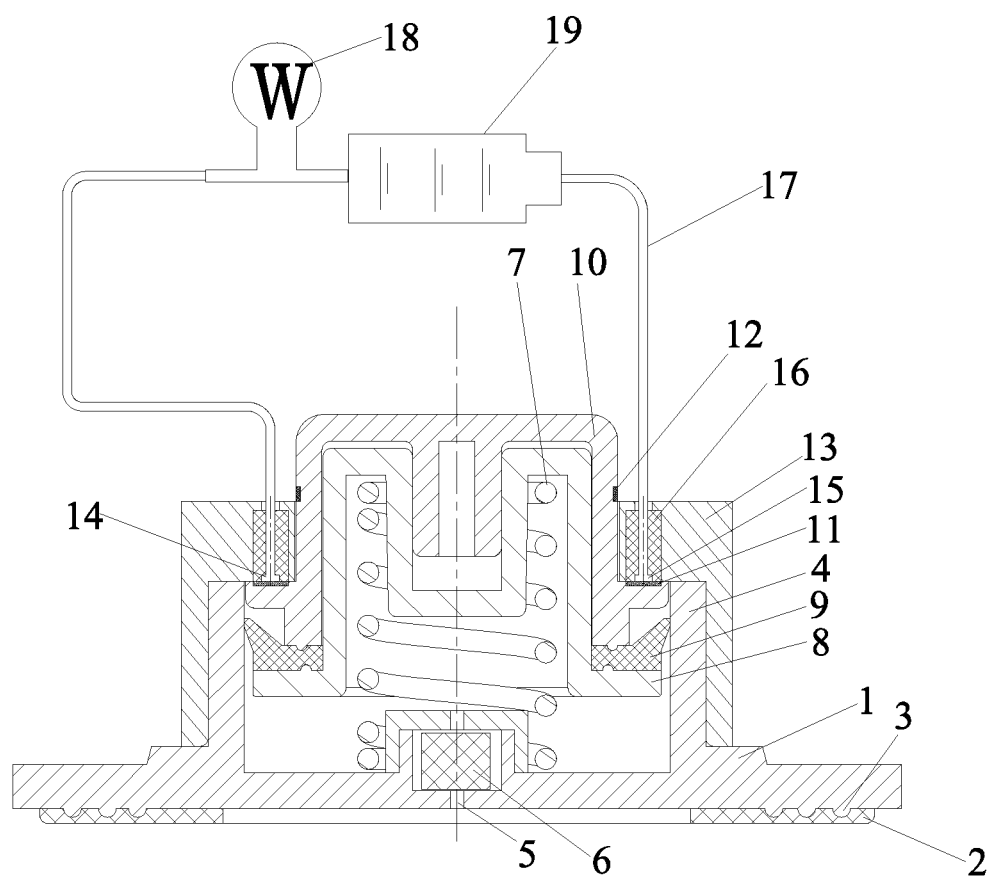
FIG. 1 is a schematic sectional diagram showing a hard suction cup according to an embodiment of the present invention before usage.

As shown in FIG. 1, a high-negative-pressure hard suction cup according to the present invention is made of a hard, composite material and is capable of attaching to an object's airtight surface regardless of the smoothness and flatness of the surface. The hard suction cup includes a main member 1 and a highly flexible washer 2 made of soft plastic. The washer 2 is tightly joined to a bottom side of the main member 1. At an interface of the main member 1 with the washer 2, a number of protruding ribs 3 are configured. The ribs 3 press and deform the washer 2, and may even embed into recesses on the object, thereby forming multiple rings of sealing, completely blocking air conduction between the inside and outside of the hard suction cup, and securing a high degree of vacuum inside the hard suction cup. The hard suction cup further include a vacuuming mechanism configured on another side of the main member 1 oppositely to the washer 2. The vacuuming mechanism includes a cylindrical piston chamber 4, a one-way valve 6, a piston assembly, a spring 7, and a chamber cap 13. The piston chamber 4 surrounds a channel 5 running vertically through the main member 1 and connecting the inside of the piston chamber 4 to outside of the main member 1. The one-way valve 6 is configured inside the piston chamber 4 above the channel 5. The spring 7 is configured inside the piston chamber 4 and surrounds the one-way valve 6. The chamber cap 13 is disposed at a top end of the piston chamber 4.

The piston assembly is configured in the piston chamber 4 and is supported by the spring 7. The piston assembly therefore is vertically moveable within the piston chamber 4 under the confinement of the chamber cap 13 through the elasticity of the spring 7. The piston assembly includes a piston body 8 having an M-shaped section, a sealing ring 9 on a bottom flange of the piston body 8, and a button 10 mounted on the piston body 8. A conductive ring 11 is configured on a bottom flange of the button 10, and an alert marking 12 is configured on a circumference of the button 10. The hard suction cup further includes a vacuum alarming assembly. The vacuum alarming assembly includes a first conductive column 14, a second conductive column 15, two insulating elastic bodies 16, conductive wires 17, a battery 19, and an audio/visual indicator 18. The insulating elastic bodies 16 are disposed oppositely in the chamber cap 13. The first and second conductive columns 14 and 15 are embedded in the insulating elastic bodies 16, respectively, and are series-connected to the audio/visual indicator 18 and the battery 19 through the wires 17. The contact or separation of the first and second conductive columns 14 and 15 with or from the conductive ring 11 closes or breaks a circuit involving the audio/visual indicator 18 and the battery 19, therefore turning on or off the audio/visual indicator 18.

Figure 2:
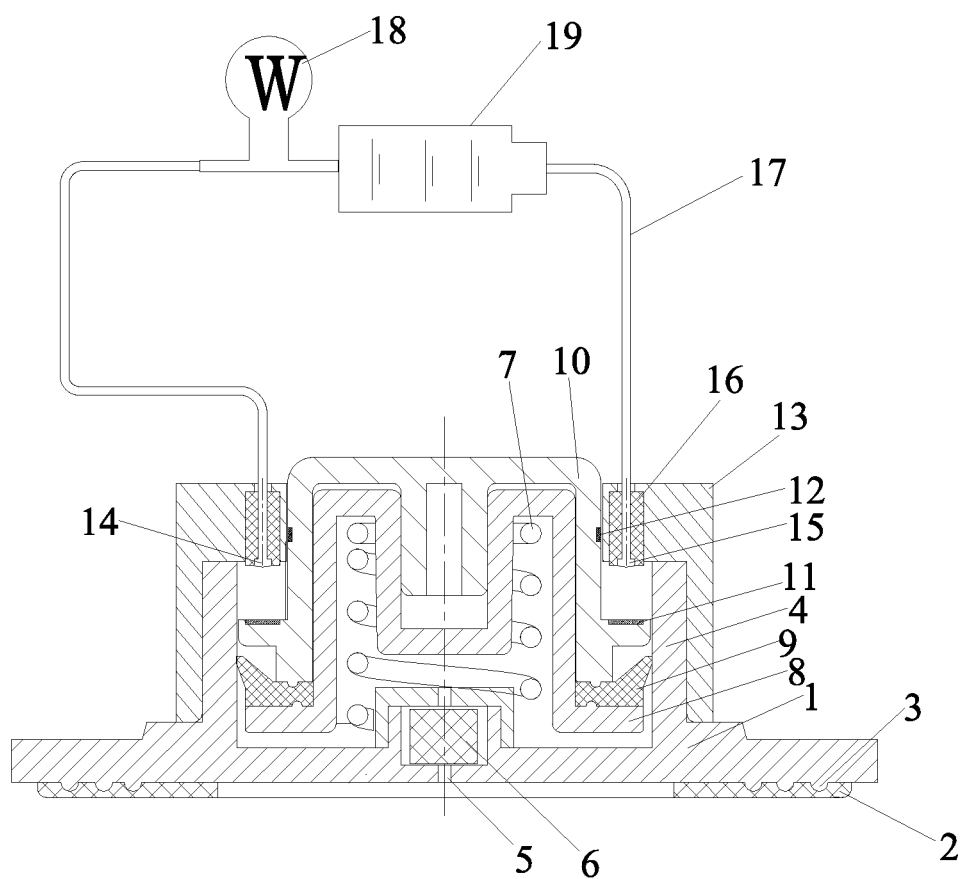
FIG. 2 is a schematic sectional diagram showing the hard suction cup of FIG. 1 during usage.

As shown in FIG. 2, to put the hard suction cup into use, the hard suction cup is attached to an object's surface. The button 10 is depressed and the piston assembly is moved as well. The air between the object and the hard suction cup is pressurized to flow away through the gap between the sealing ring 9 and the piston chamber 4, thereby achieving a high degree of vacuum. After releasing the button 10, the spring 7 restores the piston assembly. Negative pressure is produced between the hard suction cup and the object, and the two are as such tightly pressed together. When the button 10 is depressed and the piston assembly is moved again, the negative pressure within the piston chamber 4 is reduced, and the one-way valve 6 closes the channel 5. The pressurized air in the piston chamber 4 again flows through the gap between the sealing ring 9 and the piston chamber 4, and the degree of vacuum within the piston chamber 4 is further enhanced. After releasing the button 10, the spring 7 again restores the piston assembly. The one-way valve 6 opens the channel 5, the degree of vacuum within the piston chamber 4 and the degree of vacuum between the hard suction cup and the object reach a balance. By repeating the above operation multiple times, the degree of vacuum between the hard suction cup and the object would be again and again enhanced, until the resilience of the spring 7 cannot restore the piston assembly under the atmospheric pressure on the piston assembly. At the moment, the conductive ring 11 on the piston assembly is separated from the first and second conductive columns 14 and 15, breaking up the circuit between the audio/visual indicator 18 and the battery 19. When some amount of air permeates into the piston chamber 4 and the degree of vacuum drops, the resilience of the spring 7 gradually restores the piston assembly until the conductive ring 11 touches the first and second conductive columns 14 and 15. The circuit between the audio/visual indicator 18 and the battery 19 is closed and the audio/visual indicator 18 issues audio or visual alarm. In the meantime, the alert marking 11 is also exposed. At this moment, there is still some degree of vacuum between the hard suction cup and the object, and the hard suction cup does not fall off. Through the audio or visual alarm, a user is alerted to depress the button 10 multiple times to restore a high degree of vacuum between the hard suction cup and the object.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A suction cup, characterized in that:
   the suction cup has a main member made of a composite material joined to a flexible washer made of plastic along a bottom side of the main member;
   a vacuuming mechanism is mounted to another side of the main member;
   the vacuuming mechanism comprises a piston chamber, and a one-way valve, a piston assembly, and a spring, all inside the piston chamber;
   a vacuum alarming assembly is mounted on the piston assembly;
   a plurality of protruding ribs are mounted at an interface of the main member with the washer;
   the piston chamber surrounds a channel running vertically through the main member and connecting the inside of the piston chamber to outside of the main member; and
   the one-way valve is disposed above the channel.

2. The hard suction cup according to claim 1, characterized in that
   the piston assembly is supported by the spring and the piston assembly therefore is vertically moveable within the piston chamber; and
   the piston assembly comprises a piston body, a sealing ring on a bottom flange of the piston body, a button mounted on the piston body, a conductive ring configured on a bottom flange of the button, and an alert marking configured on a circumference of the button.

3. The hard suction cup according to claim 2, wherein
   the vacuum alarming assembly comprises a first conductive column, a second conductive column, two insulating elastic bodies, conductive wires, a battery, and an audio/visual indicator;
   the insulating elastic bodies are disposed oppositely in a chamber cap mounted on a top end of the piston chamber;

the first and second conductive columns are embedded in the insulating elastic bodies, respectively, and are series-connected to the audio/visual indicator and the battery through the wires; and the contact or separation of the first and second conductive columns with or from the conductive ring closes or breaks a circuit involving the audio/visual indicator and the battery, therefore turning on or off the audio/visual indicator.

\* \* \* \* \*